US009969379B2

(12) United States Patent
Nanahara et al.

(10) Patent No.: US 9,969,379 B2
(45) Date of Patent: May 15, 2018

(54) METHOD FOR DETECTING FLUID LEAKAGE

(71) Applicants: TOYOTA JIDOSHA KABUSHIKI KAISHA, Toyota-shi, Aichi-ken (JP); ADVICS CO., LTD., Kariya, Aichi-pref. (JP)

(72) Inventors: Masaki Nanahara, Toyota (JP); Masayasu Ohkubo, Okazaki (JP); Kazutaka Noro, Chiryu (JP); Masaki Ninoyu, Obu (JP); Takahiro Okano, Chiryu (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 186 days.

(21) Appl. No.: 14/812,831

(22) Filed: Jul. 29, 2015

(65) Prior Publication Data

US 2016/0059839 A1    Mar. 3, 2016

(30) Foreign Application Priority Data

Sep. 3, 2014  (JP) .................................. 2014-178753

(51) Int. Cl.
*B60T 17/22* (2006.01)
*G01M 3/28* (2006.01)
(Continued)

(52) U.S. Cl.
CPC ............ *B60T 17/221* (2013.01); *B60T 7/042* (2013.01); *B60T 13/146* (2013.01);
(Continued)

(58) Field of Classification Search
CPC ........ G01M 3/2876; G01L 5/28; B60T 17/221
See application file for complete search history.

(56) References Cited

U.S. PATENT DOCUMENTS 4,100,792 A  *  7/1978  Leiber .................. B60T 17/221
                                                    303/122
5,004,299 A  *  4/1991  Brearley ................. B60T 8/00
                                                    303/118.1
(Continued)

FOREIGN PATENT DOCUMENTS

JP  2013-227016 A  11/2013
WO  2010/109525 A1  9/2010

*Primary Examiner* — Hezron E Williams
*Assistant Examiner* — Alex Devito
(74) *Attorney, Agent, or Firm* — Oliff PLC

(57) ABSTRACT

A method for detecting fluid leakage from a pressure-decrease valve in a hydraulic brake system having an ABS device including: a shutoff valve for shutting off supply of a working fluid from a fluid-pressure supply source to a brake device provided for a wheel; the pressure-decrease valve for discharging the working fluid from the brake device; a reservoir for storing the working fluid discharged from the pressure-decrease valve; and a return pump for returning the working fluid stored in the reservoir to a portion between the shutoff valve and the fluid-pressure supply source, the method including the steps of: activating the return pump in a state in which the hydraulic brake system is not in ABS operation, and detecting the fluid leakage from the pressure-decrease valve based on a variation in a pressure of the working fluid in the fluid-pressure supply source caused when the return pump is activated.

5 Claims, 2 Drawing Sheets

(51) Int. Cl.
    *B60T 7/04*           (2006.01)
    *B60T 13/14*        (2006.01)
    *B60T 13/66*        (2006.01)
    *B60T 13/68*        (2006.01)

(52) U.S. Cl.
    CPC .......... *B60T 13/662* (2013.01); *B60T 13/686* (2013.01); *G01M 3/2876* (2013.01)

(56) References Cited

U.S. PATENT DOCUMENTS 5,015,043 A * 5/1991 Resch .................... B60T 8/4275
                                                             180/197
8,894,159 B2   11/2014 Nakata et al.

* cited by examiner

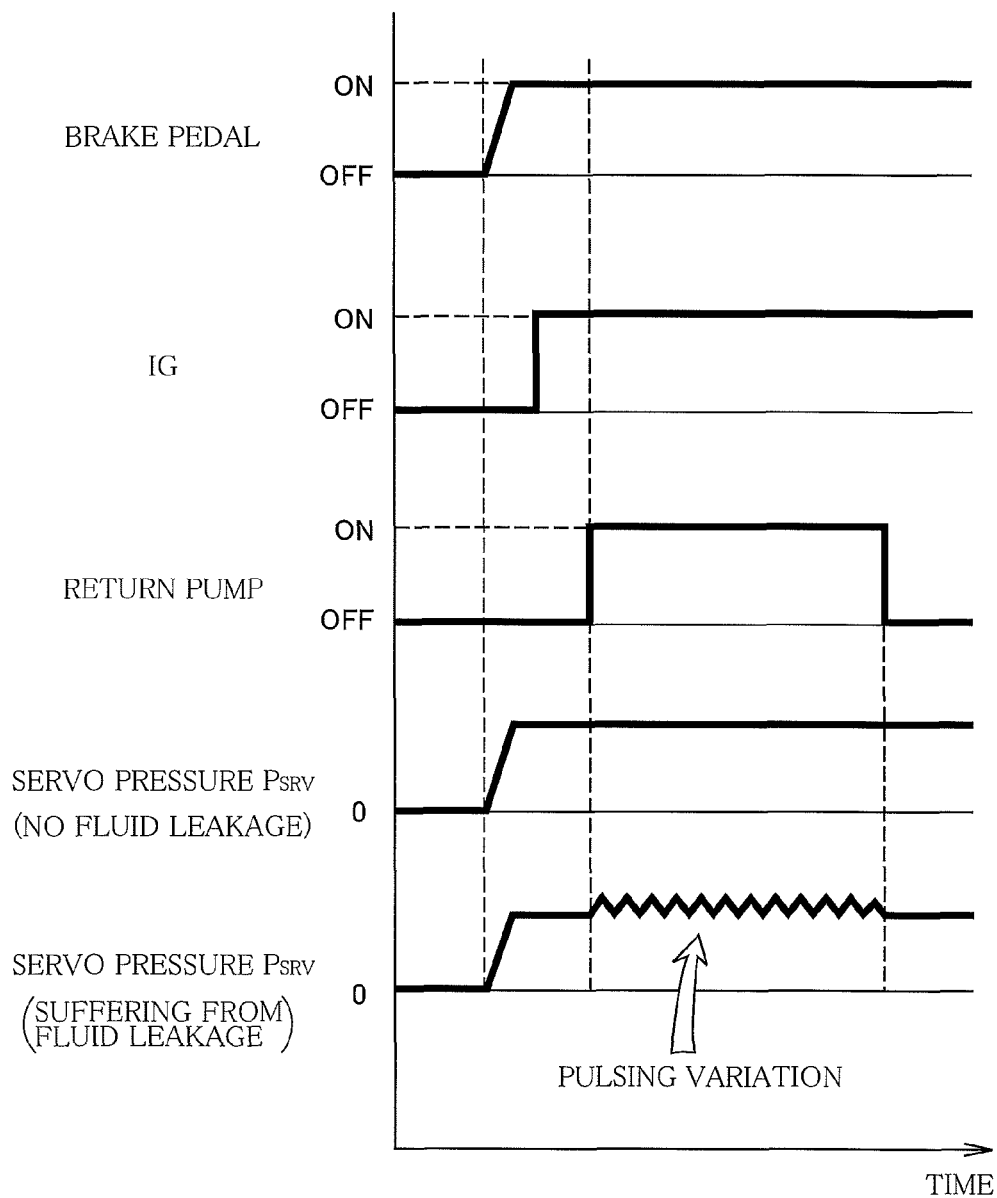

METHOD FOR DETECTING FLUID LEAKAGE

CROSS REFERENCE TO RELATED APPLICATION

The present application claims priority from Japanese Patent Application No. 2014-178753, which was filed on Sep. 3, 2014, the disclosure of which is herein incorporated by reference in its entirety.

BACKGROUND OF THE INVENTION

Field of the Invention

The present invention relates to a method for detecting fluid leakage in a hydraulic brake system.

Description of the Related Art

Detection of fluid leakage in a hydraulic brake system for vehicles is a matter of great importance. For instance, the following Patent Literature describes a technique of detecting and dealing with fluid leakage in the hydraulic brake system, specifically, fluid leakage from one valve in the hydraulic brake system.

Patent Literature 1: WO 2010/109525 A1

SUMMARY OF THE INVENTION

Ordinary hydraulic brake systems including the hydraulic brake system described in the above Patent Literature have a pressure-decrease valve for discharging the working fluid supplied to a brake device for a wheel, so as to attain ABS function (antilock function). Fluid leakage from the pressure-decrease valve may cause a situation in which the braking force is reduced, for instance. Consequently, detection of fluid leakage from the pressure-decrease valve is strongly demanded, and it is also strongly demanded that fluid leakage be detected by a practical method. It is an object of the invention to provide a practical method for detecting fluid leakage from the pressure-decrease valve.

To attain the object indicated above, the invention provides a method for detecting fluid leakage from a pressure-decrease valve in a hydraulic brake system having an ABS device including: a shutoff valve for shutting off supply of a working fluid from a fluid-pressure supply source to a brake device provided for a wheel; the pressure-decrease valve for discharging the working fluid from the brake device; a reservoir for storing the working fluid discharged via the pressure-decrease valve; and a return pump for returning the working fluid stored in the reservoir to a portion between the shutoff valve and the fluid-pressure supply source, the method comprising the steps of: activating the return pump in a state in which the hydraulic brake system is not in ABS operation; and detecting the fluid leakage from the pressure-decrease valve based on a variation in a pressure of the working fluid in the fluid-pressure supply source caused when the return pump is activated.

When the pressure-decrease valve is suffering from fluid leakage in the hydraulic brake system, the leaked working fluid is stored in the reservoir. When the return pump is activated in a state in which the working fluid is stored in the reservoir, the pressure of the working fluid in the fluid-pressure supply source varies due to the returned working fluid. In the present method for detecting fluid leakage, the fluid leakage from the pressure-decrease valve is detected based on the variation. According to the present method for detecting fluid leakage, it is possible to easily detect the fluid leakage by activating the return pump of the ABS device. Thus, the present method is practical.

FORMS OF THE INVENTION

In the method for detecting fluid leakage according to the invention, the "variation in a pressure of the working fluid in the fluid-pressure supply source" based on which the fluid leakage is detected does not mean only a pressure increase caused by the returned working fluid. It also includes a minute pressure variation such as a pulsing variation (pulsation) of the working fluid caused by activation of the return pump as long as the variation is detectable. Further, the "pressure of the working fluid in the fluid-pressure supply source" is not limited to the pressure of the working fluid supplied to the brake device, but may be a pressure of the working fluid existing at any portion in the fluid-pressure supply source as long as a variation of the pressure is detectable.

Various sorts of the "fluid-pressure supply source" exist. For instance, the fluid-pressure supply source may be constituted only by a master cylinder device or only by a high-pressure-source device including a pump as a main constituent element. The fluid-pressure supply source may be constituted by a combination of various devices such as the master cylinder device and the high-pressure-source device. The method for detecting fluid leakage according to the invention is applicable to hydraulic brake systems that employ various sorts of the fluid-pressure supply source. The "shutoff valve" and the "pressure-decrease valve" are not limited to open/close valves configured to be simply opened and closed. In an instance where the hydraulic brake system is configured to control the fluid pressure supplied to the brake device by a pressure-increase linear valve and a pressure-decrease linear valve, the pressure-increase linear valve and the pressure-decrease linear valve function as the "shutoff valve" and the "pressure-decrease valve", respectively.

The method for detecting fluid leakage according to the invention is preferably applied to the hydraulic brake system configured such that the fluid-pressure supply source includes: (a) a pressure regulator device configured to regulate the working fluid supplied from a high-pressure source and to supply the working fluid whose pressure is regulated; (b) a brake operation member on which a braking operation by a driver is performed; and (c) a master cylinder device to which the working fluid supplied from the pressure regulator device is introduced and which is configured to supply, in a normal state, the working fluid whose pressure depends not on an operation force applied to the brake operation member but on a pressure of the introduced working fluid, to the brake device via the ABS device.

In the hydraulic brake system constructed as described above, influences of events that arise from the fluid leakage of the pressure-decrease valve, such as a decrease in the fluid pressure in the brake device, excessive supply of the working fluid or the like, do not manifest as an unnatural feeling with respect to an operation on a brake operation member such as a brake pedal. Specifically, even if the fluid leakage is occurring, it is not necessary to depress the brake pedal further than usual. Consequently, the method for detecting fluid leakage according to the invention is particularly effective in the hydraulic brake system in which the fluid leakage cannot be felt as the unnatural feeling with respect to the braking operation.

In the hydraulic brake system constructed as described above, in an instance where the fluid-pressure supply source includes a pressure detector configured to detect a pressure of the working fluid supplied from the pressure regulator device, and the hydraulic brake system is configured to control, in the normal state, the pressure of the working fluid supplied from the pressure regulator device such that the pressure detected by the pressure detector becomes equal to a target pressure, for controlling a braking force to be generated by the brake device, the fluid leakage from the pressure-decrease valve may be detected based on a variation in the pressure detected by the pressure detector in the step of detecting fluid leakage. That is, the fluid leakage from the pressure-decrease valve can be easily detected utilizing the pressure detector provided in the hydraulic brake system. In such a hydraulic brake system, it is not necessary to detect the pressure of the working fluid supplied from the master cylinder device, and the hydraulic brake system does not have a pressure detector for detecting the pressure, i.e., the so-called master-pressure sensor. Consequently, it is possible to easily detect the fluid leakage from the pressure-decrease valve even in the hydraulic brake system without having the pressure detector for detecting the pressure of the working fluid supplied from the master cylinder device.

In an instance where the pressure regulator device includes a mechanical pressure regulator configured to regulate a pressure of the working fluid supplied from the high-pressure source to supply the working fluid having a pressure in accordance with a pilot pressure and the pressure regulator device is configured to control the pressure of the working fluid to be supplied from the pressure regulator device by adjusting the pilot pressure, the fluid leakage from the pressure-decrease valve may be detected, in the step of detecting fluid leakage, based on a pulsing variation of the pressure detected by the pressure detector, the pulsing variation depending on a motion of the return pump. In the hydraulic brake system including the mechanical pressure regulator described above, the pressure of the working fluid supplied from the pressure regulator device does not largely increase even if the return pump is activated in a state in which the pressure-decrease valve is suffering from the fluid leakage. In such a system, it is possible sufficiently detect the fluid leakage from the pressure-decrease valve by detecting a minute pulsing variation.

The fluid leakage from the pressure-decrease valve is preferably detected at the time of startup of a vehicle on which the hydraulic brake system is installed. In this case, the fluid leakage can be detected before the vehicle starts to run. Further, even when the degree of the fluid leakage is low, there is a high possibility that a large amount of the working fluid is stored in the reservoir before detection. Such a low degree of the fluid leakage can be sufficiently detected.

BRIEF DESCRIPTION OF THE DRAWINGS

The objects, features, advantages, and technical and industrial significance of the invention will be better understood by reading the following detailed description of an embodiment of the invention, when considered in connection with the accompanying drawings, in which:

FIG. 2 is a time chart showing a state in which the method for detecting fluid leakage according to one embodiment is being conducted.

DETAILED DESCRIPTION OF THE EMBODIMENT

Figure 1:
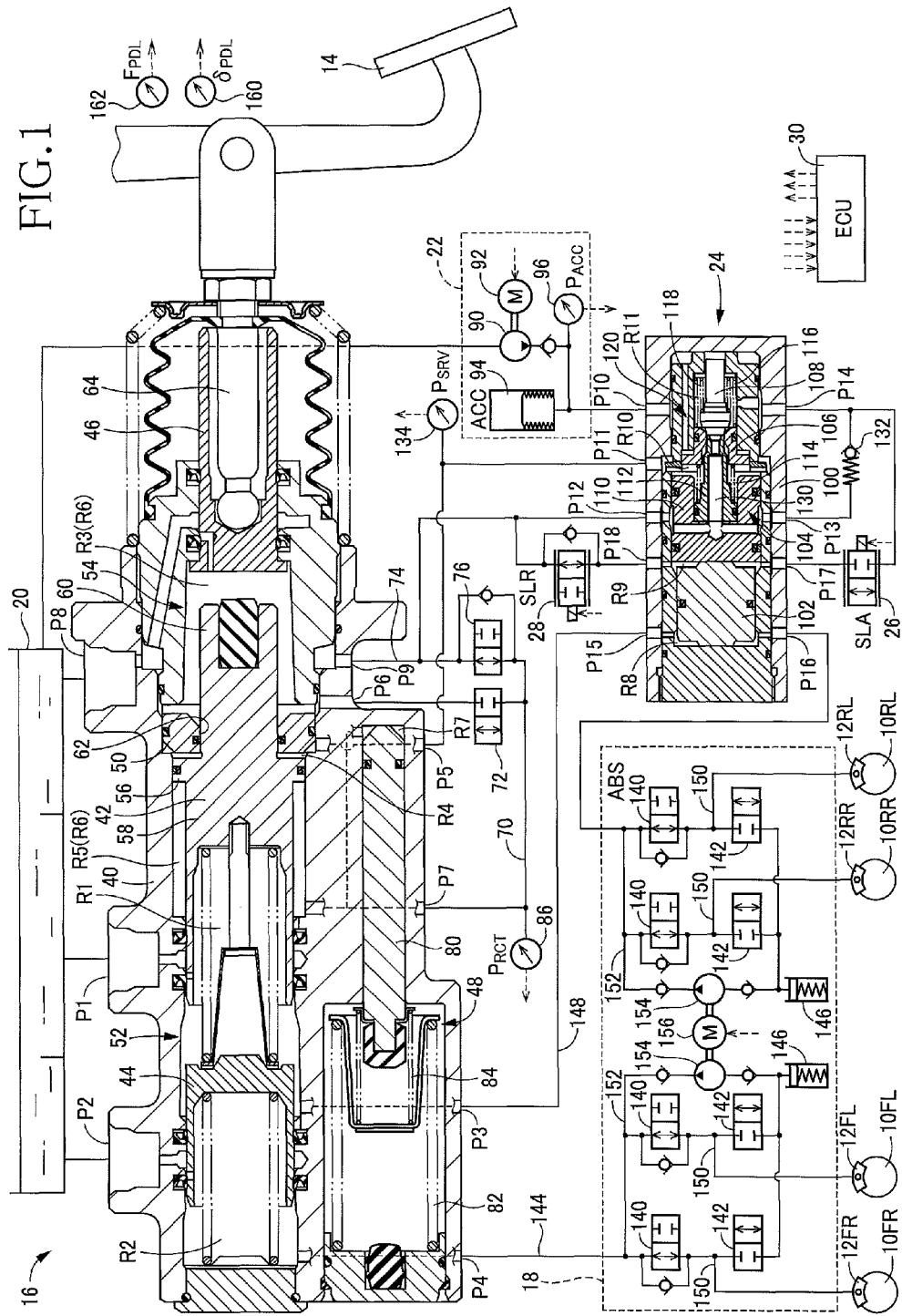
FIG. 1 is a view showing a hydraulic brake system to which is applied a method for detecting fluid leakage according to one embodiment.

Referring to the drawings, there will be hereinafter explained in detail a method for detecting fluid leakage according to one embodiment of the invention. It is to be understood that the invention is not limited to the details described in the following embodiment and the FORMS OF THE INVENTION, but may be embodied with various changes and modifications based on knowledge of those skilled in the art.

<Structure of Hydraulic Brake System to which Method for Detecting Fluid Leakage is Applied>

1. Overall Structure

A hydraulic brake system for vehicles to which a method for detecting fluid leakage according to one embodiment is applied is installed on hybrid vehicles in which a brake oil is used as a working fluid. As shown in FIG. 1, the present hydraulic brake system generally includes (A) four brake devices 12 which are provided for respective four wheels 10 and each of which is configured to generate a braking force, (B) a master cylinder device 16 to which is input an operation of a brake pedal 14 as a brake operation member and which is configured to supply a pressurized working fluid to each brake device 12, (C) an antilock unit 18, as an ABS device, disposed between the master cylinder device 16 and the four brake devices 12, (D) a high-pressure-source device 22, as a high-pressure source, configured to pump up the working fluid from a reservoir 20 as a low-pressure source and to pressurize the pumped fluid, so as to supply the working fluid that is highly pressurized, (E) a regulator 24, as a mechanical pressure regulator, configured to regulate a pressure of the working fluid supplied from the high-pressure-source device 22 and to supply, to the master cylinder device 16, the working fluid whose pressure is regulated, (F) an electromagnetic pressure-increase linear valve 26 and an electromagnetic pressure-decrease linear valve 28 (hereinafter simply referred to as "pressure-increase linear valve 26" and "pressure-decrease linear valve 28", respectively, where appropriate) for adjusting a pressure of the working fluid supplied from the regulator 24, and (G) a brake electronic control unit 30, as a controller, configured to control the hydraulic brake system by controlling the devices, equipment, valves, and so on. It is noted that the antilock unit 18 may be referred to as "ABS unit 18" where appropriate and a sign "ABS" is attached in FIG. 1. The pressure-increase linear valve 26 and the pressure-decrease linear valve 28 are respectively marked with signs "SLA" and "SLR" in FIG. 1. The brake electronic control unit 30 may be referred to as "brake ECU 30" where appropriate and is marked with a sign "ECU" in FIG. 1. Where it is necessary to distinguish the four wheels 10 in terms of "front", "rear", "right", and "left", the four wheels 10 are indicated as a front right wheel 10FR, a front left wheel 10FL, a rear right wheel 10RR, and a rear left wheel 10RL, respectively. Where it is necessary to similarly distinguish the constituent elements, the same suffixes as used for the wheels 10 are used. For instance, the four brake devices 12 are indicated as 12FR, 12FL, 12RR, and 12RL, respectively, where appropriate.

2. Brake Device

Each of the brake devices 12 provided for the respective wheels 10 is a disc brake device including a disc rotor that rotates together with the wheel 10, a caliper held by a carrier, a wheel cylinder held by the caliper, and brake pads held by the caliper and configured to be moved by the wheel cylinder so as to sandwich the disc rotor.

3. Master Cylinder Device

The master cylinder device 16 is a master cylinder device in which a stroke simulator is integrally incorporated. In general, the master cylinder device 16 has a housing 40 in which two pressurizing pistons, i.e., a first pressurizing piston 42 and a second pressurizing piston 44, and an input piston 46 are disposed, and a stroke simulator mechanism 48 is incorporated in the housing 40. In the following explanation about the master cylinder device 16, a leftward direction and a rightward direction in FIG. 1 are respectively referred to as a forward direction and a rearward direction for the sake of convenience. Similarly, a leftward movement and a rightward movement of the pistons, etc., explained below are respectively referred to as a forward or advancing movement and a rearward or retracting movement.

The housing 40 has a space in which are accommodated the first pressurizing piston 42, the second pressurizing piston 44, and the input piston 46. The space is closed at its front-side end and is partitioned by an annular partition portion 50 into a front-side chamber 52 and a rear-side chamber 54. The second pressurizing piston 44 has a cylindrical shape which is open on its front side and closed on its rear side. The second pressurizing piston 44 is disposed at a frond-side portion of the front-side chamber 52. The first pressurizing piston 42 has a cylindrical shape having a closed end and includes: a main body portion 58 having a flange 56 formed at a rear end of the main body portion 58; and a protruding portion 60 that extends rearward from the main body portion 58. The main body portion 58 is disposed in the front-side chamber 52 so as to be located rearward of the second pressurizing piston 44. The annular partition portion 50 has an opening 62 at its central portion, and the protruding portion 60 extends into the rear-side chamber 54 through the opening 62. The input piston 46 is disposed in the rear-side chamber 54 such that the input piston 46 partially extends into the rear-side chamber 54 from the rear side. The brake pedal 14 is connected to a rear end of the input piston 46 via a link rod 64.

A first pressurizing chamber R1 is formed between the first pressurizing piston 42 and the second pressurizing piston 44, more specifically, on the front side of the main body portion 58 of the first pressurizing piston 42. In the first pressurizing chamber R1, the working fluid to be supplied to the two brake devices 12RR, 12RL corresponding to the respective two rear wheels 10RR, 10RL is pressurized by a forward movement of the first pressurizing piston 42. Further, a second pressurizing chamber R2 is formed on the front side of the second pressurizing piston 44. In the second pressurizing chamber R2, the working fluid to be supplied to the brake devices 12FR, 12FL corresponding to the respective two front wheels 10FR, 10FL is pressurized by a forward movement of the second pressurizing piston 44. Further, an inter-piston chamber R3 is formed between the first pressurizing piston 42 and the input piston 46. More specifically, the inter-piston chamber R3 is formed such that a rear end of the protruding portion 60 that extends rearward from the opening 62 formed in the partition portion 50 and a front end of the input piston 46 face to each other, namely, such that the first pressurizing piston 42 and the input piston 46 face to each other utilizing the opening 62. Further, in the front-side chamber 52 of the housing 40, there are formed: an annular input chamber R4 to which the working fluid supplied from the regulator 24 is input; and an annular opposing chamber R5. More specifically, the input chamber R4 is formed around an outer circumference of the protruding portion 60 so as to be defined by a front end face of the partition portion 50 and a rear end face of the main body portion 58 of the first pressurizing piston 42, i.e., a rear end face of the flange 56. The opposing chamber R5 is formed forward of the flange 56 around an outer circumference of the main body portion 58 such that the opposing chamber R5 is opposed to the input chamber R4 with the flange 56 interposed therebetween.

The first pressurizing chamber R1 is fluidly communicable with the reservoir 20 via an atmospheric-pressure port P1 when the first pressurizing piston 42 is located at a rear end position in its movement range while the second pressurizing chamber R2 is fluidly communicable with the reservoir 20 via an atmospheric-pressure port P2 when the second pressurizing piston 44 is located at a rear end position in its movement range. The first pressurizing chamber R1 and the second pressurizing chamber R2 communicate with the brake devices 12 via respective output ports P3, P4 and via the ABS unit 18. In this respect, the first pressurizing chamber R1 communicates with the brake devices 12RR, 12RL also via the regulator 24 (that will be later explained). Further, the input chamber R4 communicates with a regulated-pressure port of the regulator 24 (that will be later explained) via an input port P5.

The inter-piston chamber R3 communicates with a communication port P6 while the opposing chamber R5 communicates with a communication port P7. The communication port P6 and the communication port P7 are connected by an inter-chamber communication passage 70 as an external communication passage. At a certain position in the inter-chamber communication passage 70, there is provided a normally closed electromagnetic open/close valve 72, namely, an open/close valve 72 configured to be closed in a non-energized state and opened in an energized state. When the open/close valve 72 is placed in an open state, the inter-piston chamber R3 and the opposing chamber R5 are brought into communication with each other. In a state in which the inter-piston chamber R3 and the opposing chamber R5 are held in communication with each other, the chambers R3, R5 define one fluid chamber. That is, a fluid chamber that may be referred to as a reaction-force chamber R6 is defined. The open/close valve 72 has a function of switching a communication state of the inter-piston chamber R3 and the opposing chamber R5 between a communicating state and a non-communicating state. In view of this, the open/close valve 72 will be hereinafter referred to as "inter-chamber-communication switching valve 72".

The master cylinder device 16 has two more atmospheric-pressure ports P8, P9 that communicate with each other via an internal passage. The atmospheric-pressure port P8 is connected to the reservoir 20 while the atmospheric-pressure port P9 is connected, between the inter-chamber-communication switching valve 72 and the opposing chamber R5, to the inter-chamber communication passage 70 via an atmospheric-pressure release passage 74 as an external communication passage. In the atmospheric-pressure release passage 74, there is provided a normally open electromagnetic open/close valve 76, namely, an open/close valve 76 configured to be opened in a non-energized state and closed in an energized state. The open/close valve 76 has a function of releasing the opposing chamber R5 to the atmospheric pressure. In view of this, the open/close valve 76 will be hereinafter referred to as "atmospheric-pressure release valve 76" where appropriate.

The housing 40 has a space different from the space in which the first pressurizing piston 42, the second pressurizing piston 44, and the input piston 46 are disposed. The stroke simulator mechanism 48 is constituted by the space in question, a reaction-force piston 80 disposed in the space, and two reaction-force springs 82, 84 (both of which are compression coil springs) for biasing the reaction-force piston 80. On the rear side of the reaction-force piston 80, a buffer chamber R7 is formed. (In FIG. 1, the buffer chamber R7 is illustrated in an almost deflated or compressed state). When the input piston 46 moves forward by an operation of the brake pedal 14, the working fluid in the opposing chamber R5, i.e., the working fluid in the reaction-force chamber R6, is introduced into the buffer chamber R7 via an inner passage, and elastic forces of the reaction-force springs 82, 84 in accordance with the introduced amount of the working fluid, namely, in accordance with the amount of the forward movement of the input piston 46, act on the reaction-force chamber R6, whereby an operation reaction force is applied to the brake pedal 14. That is, the stroke simulator mechanism 48 functions as a reaction-force applying mechanism for applying, to the input piston 46, a reaction force against the forward movement of the input piston 46 having a magnitude in accordance with the amount of the forward movement of the input piston 46. The two reaction-force springs 82, 84 are disposed in series, and the reaction-force spring 84 has a spring constant considerably smaller than that of the reaction-force spring 82. Thus, the stroke simulator mechanism 48 is configured to effectuate reaction-force characteristics in which an increase gradient of the reaction force becomes large from a certain point in the progress of the operation of the brake pedal 14 by inhibiting the reaction-force spring 84 from being deformed at the certain point in the progress of the operation of the brake pedal 14. In the present system, there is provided, in the inter-chamber communication passage 70, a reaction-force pressure sensor 86 for detecting a pressure of the working fluid in the reaction-force chamber R6 (reaction-force pressure). (In FIG. 1, the reaction-force pressure sensor 86 is marked with a sign "$P_{RCT}$" indicative of the reaction-force pressure.

In a normal condition, the inter-chamber-communication switching valve 72 is in the open state while the atmospheric-pressure release valve 76 is in the closed state, and the reaction-force chamber R6 is defined by the inter-piston chamber R3 and the opposing chamber R5. In the present master cylinder device 16, a pressure receiving area (pressure receiving area with respect to the inter-piston chamber) of the first pressurizing piston 42 on which a pressure of the working fluid in the inter-piston chamber R3 acts for moving the first pressurizing piston 42 forward, namely, an area of a rear end face of the protruding portion 60 of the first pressurizing piston 42, is made equal to a pressure receiving area (pressure receiving area with respect to the opposing chamber) of the first pressurizing piston 42 on which a pressure of the working fluid in the opposing chamber R5 acts for moving the first pressurizing piston 42 rearward, namely, an area of a front end face of the flange 56 of the first pressurizing piston 42. Accordingly, even if the input piston 46 is moved forward by operating the brake pedal 14, the first pressurizing piston 42 and the second pressurizing piston 44 do not move forward by an operation force, namely, by the pressure in the reaction-force chamber R6, and the working fluid pressurized by the master cylinder device 16 is not supplied to the brake devices 12. On the other hand, when a pressure of the working fluid from the high-pressure-source device 22 is introduced into the input chamber R4, the first pressurizing piston 42 and the second pressurizing piston 44 move forward in dependence on the pressure of the working fluid, and the working fluid pressurized in accordance with a pressure of the working fluid in the input chamber R4 is supplied to the brake devices 12. That is, according to the master cylinder device 16, there is effectuated, in the normal condition (the normal state), a state in which the braking force is generated depending on the high-pressure-source pressure, namely, a state in which the brake devices 12 generate the braking force having a magnitude that depends on the pressure of the working fluid supplied from the high-pressure-source device 22 to the master cylinder device 16, i.e., the pressure of the working fluid supplied from the regulator 24 to the master cylinder device 16, without depending on the operation force applied to the brake pedal 14.

The vehicle on which the present system is installed is a hybrid vehicle as described above, and a regenerative braking force is accordingly available. It is consequently needed for the brake devices 12 to generate a braking force that corresponds to a difference obtained by subtracting the regenerative braking force from a braking force that is determined based on the braking operation. The present system effectuates the above-indicated state in which the braking force is generated depending on the high-pressure-source pressure, so that the brake devices 12 can generate the braking force that does not depend on the brake operation force. Thus, the present system is a hydraulic brake system suitable for hybrid vehicles.

In the case of electric failure or the like, on the other hand, the inter-chamber-communication switching valve 72 is in the closed state, the atmospheric-pressure release valve 76 is in the open state, and the inter-piston chamber R3 is hermetically closed while the opposing chamber R5 is released to the atmospheric pressure. In this state, the operation force applied to the brake pedal 14 is transmitted to the first pressurizing piston 42 via the working fluid in the inter-piston chamber R3, so that the first pressurizing piston 42 and the second pressurizing piston 44 move forward. That is, there is effectuated a state in which the braking force is generated depending on the operation force, namely, a state in which the brake devices 12 generate the braking force having a magnitude that depends on the operation force applied to the brake pedal 14. When the inter-chamber-communication switching valve 72 is placed in the closed state, the atmospheric-pressure release valve 76 is placed in the open state, and the working fluid is introduced from the high-pressure-source device 22 into the input chamber R4, the first pressurizing piston 42 and the second pressurizing piston 44 are moved forward by both of: the pressure of the working fluid supplied from the high-pressure-source device 22 to the master cylinder device 16; and the operation force. As a result, there is effectuated a state in which the braking force is generated depending on the operation force and the high-pressure-source pressure, namely, a state in which the brake devices 12 generate the braking force that depends on both of the operation force and the high-pressure-source pressure, namely, the braking force that is a sum of the braking force whose magnitude depends on the pressure of the working fluid supplied from the high-pressure-source device 22 to the master cylinder device 16 and the braking force whose magnitude depends on the operation force.

4. High-Pressure-Source Device

The high-pressure-source device 22 includes: a pump 90 configured to pump up the working fluid from the reservoir 20 and to pressurize the pumped working fluid; a motor 92 for driving the pump 90; and an accumulator 94 (that is marked with a sign "ACC" in FIG. 1) for accumulating the working fluid pressurized by the pump 90. The high-pressure-source device 22 is provided with a high-pressure-source pressure sensor 96 for detecting a pressure of the working fluid in the accumulator 94, namely, for detecting a pressure of the working fluid to be supplied, i.e., the highpressure-source pressure. (In FIG. 1, the high-pressure-source pressure sensor 96 is marked with a sign "$P_{ACC}$" indicative of the high-pressure-source pressure.

5. Regulator

The regulator 24 which is a mechanical regulator includes: a housing 100 having a two-piece structure and an interior space; and a first piston 102, a second piston 104, a ring-shaped valve seat 106, and a valve rod 108 that are disposed in the space of the housing 100 so as to be arranged in this order from the left side in FIG. 1 in the axial direction of the housing 100, i.e., in the left-right direction. Each of the first piston 102 and the second piston 104 functions as a movable member and is movable in the axial direction of the housing 100. The second piston 104 is constituted by a piston main body 110 having a recess and a plunger 112 fitted in the recess. The ring-shaped valve seat 106 is a cylindrical member which has a flange portion and which is open at opposite ends thereof. The ring-shaped valve seat 106 is floatingly supported by two springs 114, 116 with respect to the second piston 104 and the housing 100. A left end portion of the valve rod 108 functions as a valve member. The valve rod 108 is disposed such that the left end portion thereof functioning as the valve member can be seated on a right end portion of the ring-shaped valve seat 106 functioning as a valve seat. The valve rod 108 is biased leftward by a spring 118. That is, the ring-shaped valve seat 106, the valve rod 108, and the spring 118 provide a valve mechanism 120 that is disposed so as to be arranged with the second piston 104 functioning as the movable member in the axial direction of the housing 100. A distal (right) end of the plunger 112 of the second piston 104 is configured to be abuttable on the left end portion of the valve rod 108 within the ring-shaped valve seat 106.

A plurality of fluid chambers are formed in the space of the housing 100. More specifically, a first pilot chamber R8 is formed on the left side of the first piston 102. A second pilot chamber R9 is formed between the first piston 102 and the second piston 104. A regulated-pressure chamber R10 is formed around an outer circumference of the plunger 112 of the second piston 104 generally between the piston main body 110 and the flange portion of the ring-shaped valve seat 106. In the regulated-pressure chamber R10, there is accommodated the working fluid whose pressure is regulated and which is supplied from the regulator 24 to the master cylinder device 16. A high-pressure chamber R11 for receiving the working fluid supplied from the high-pressure-source device 22 is formed on an outer circumference of the valve rod 108. Roughly, the regulated-pressure chamber R10 is formed on one of opposite sides of the second piston 104 nearer to the valve mechanism 120, and the high-pressure chamber R11 and the regulated-pressure chamber R10 sandwich the valve mechanism 120 therebetween.

The housing 100 is provided with various ports, and the fluid chambers described above communicate with various devices of the present system via the ports. To be more specific, the working fluid from the high-pressure-source device 22 is supplied to the high-pressure chamber R11 via a high-pressure port P10. The regulated-pressure chamber R10 communicates with the input port P5 of the master cylinder device 16 via a regulated-pressure port P11. In the second piston 104, there is formed an atmospheric-pressure passage 130 constituted by a fluid passage that penetrates the plunger 112 in the axial direction and a fluid passage that communicates with the above-indicated fluid passage and that penetrates the piston main body 110 in the diametric direction. Two atmospheric-pressure ports P12, P13 communicate with each other via the atmospheric-pressure passage 130. The atmospheric-pressure port P12 is connected to the atmospheric-pressure release passage 74, whereby the atmospheric-pressure passage 130 communicates with the reservoir 20 via the master cylinder device 16. In other words, the atmospheric-pressure passage 130 functions as a low-pressure-source communication passage communicating with the low-pressure source. The atmospheric-pressure port P13 is connected, via a relief valve 132, to a high pressure-port P14 different from the above-indicated high-pressure port P10. When a pressure in the high-pressure chamber R11 becomes excessively high, the pressure in the high-pressure chamber R11 is released to the reservoir 20.

The first pilot chamber R8 communicates with the output port P3 of the master cylinder device 16 via a first pilot port P15 and communicates with the brake devices 12RR, 12RL for the rear wheels via a first pilot port P16 and the ABS unit 18. That is, the first pilot chamber R8 is a part of a passage for the working fluid supplied from the master cylinder device 16 to the brake devices 12RR, 12RL via the ABS unit 18. The second pilot chamber R9 is connected to two second pilot ports P17, P18. The second pilot port P17 is connected to the high-pressure port P14 via the pressure-increase linear valve 26 while the second pilot port P18 is connected to the atmospheric-pressure release passage 74 via the pressure-decrease linear valve 28. That is, the second pilot chamber R9 is connected to the high-pressure-source device 22 via the pressure-increase linear valve 26 and is connected to the reservoir 20 via the pressure-decrease linear valve 28. As later explained in detail, a pressure of the working fluid in the second pilot chamber R9 is adjusted to a pressure (hereinafter referred to as "adjusted pressure" where appropriate) that is adjusted by the pressure-increase linear valve 26 and the pressure-decrease linear valve 28.

A pressure-difference-based acting force acts on the second piston 104. The pressure-difference-based acting force is a force that depends on a pressure difference between: a pressure of the working fluid in the regulated-pressure chamber R10, namely, a pressure of the working fluid supplied from the regulator 24 (that is the so-called supply pressure of the pressure regulator and will be hereinafter referred to as "servo pressure" where appropriate); and a second pilot pressure that is the pressure in the second pilot chamber R9. The second piston 104 is moved in the housing 100 in the axial direction by the pressure-difference-based acting force. It is actually needed to consider the elastic reaction forces of the springs 114, 116 and so on. In short, the second piston 104 is moved rightward in FIG. 1, namely, toward the valve mechanism 120 when an acting force that depends on the second pilot pressure is dominant over an acting force that depends on the servo pressure. On the other hand, the second piston 104 is moved leftward in FIG. 1, namely, in a direction away from the valve mechanism 120 when the acting force that depends on the servo pressure is dominant over the acting force that depends on the second pilot pressure. When the second piston 104 is moved rightward, the second piston 104 comes into engagement, at the distal end of the plunger 112, with the valve mechanism 120 and the distal end of the valve rod 108 is separated away from the ring-shaped valve seat 106, whereby the regulated-pressure chamber R10 and the high-pressure chamber R11 are brought into communication with each other by the valve mechanism 120. In this case, an opening of the atmospheric-pressure passage 130 formed at the distal end of the plunger 112 is closed by the distal end of the valve rod 108, whereby communication between the regulated-pressure chamber R10 and the atmospheric-pressure passage 130 is shut off. When the second piston 104 is moved leftward, on the other hand, the distal end of the plunger 112 of the second piston 104 is disengaged from the valve mechanism 120, whereby communication between the regulated-pressure chamber R10 and the high-pressure chamber R11 is shut off. In this case, the opening of the atmospheric-pressure passage 130 is not closed by the distal end of the valve rod 108, and the regulated-pressure chamber R10 and the atmospheric-pressure passage 130 are brought into communication with each other. Owing to the operation of the regulator 24, the pressure of the working fluid in the regulated-pressure chamber R10 is regulated to a pressure in accordance with the second pilot pressure, namely, a pressure in accordance with the adjusted pressure adjusted by the pressure-increase linear valve 26 and the pressure-decrease linear valve 28. In the present system, there is provided a servo pressure sensor 134 for detecting the servo pressure. (The servo pressure sensor 134 is marked, in FIG. 1, with a sign "$P_{SRV}$" indicative of the servo pressure).

In the normal condition, the servo pressure introduced from the regulator 24 as the pressure regulator to the master cylinder device 16 is regulated to the pressure in accordance with the adjusted pressure as described above. As is understood from the explanation above, in the normal condition, a pressure of the working fluid supplied from the master cylinder device 16 to the brake devices 12 (hereinafter referred to as "master pressure" where appropriate) becomes equal to a pressure in accordance with the servo pressure. Consequently, in the normal condition, the master pressure becomes equal to the pressure in accordance with the adjusted pressure. Therefore, in the present system, the brake devices 12 generate the braking force whose magnitude depends on the adjusted pressure. In this connection, in the normal condition, a first pilot pressure that is a pressure in the first pilot chamber R8 becomes equal to the master pressure. However, a ratio between the servo pressure and the master pressure that depends on the structure of the master cylinder device 16 and a ratio between the adjusted pressure and the servo pressure that depends on the structure of the regulator 24 are set such that the first piston 102 does not move rightward in the housing 100 by a pressure-difference-based acting force that acts on the first piston 102 in dependence on a pressure difference between the second pilot pressure that is equal to the adjusted pressure and the first pilot pressure that is equal to the master pressure.

When the working fluid at the adjusted pressure cannot be supplied to the second pilot chamber R9 due to failure or the like of the pressure-increase linear valve 26, for instance, the first piston 102 and the second piston 104 move in the housing 100 in the axial direction with the first piston 102 and the second piston 104 being kept in contact with each other, namely, the first piston 102 and the second piston 104 move as a unit, by a pressure-difference-based acting force that acts based on a pressure difference between the master pressure introduced into the first pilot chamber R8 and the servo pressure. As in the normal condition, the valve mechanism 120 switches between: communication between the high-pressure chamber R11 and the regulated-pressure chamber R10; and shutting off of the communication and switches between: communication between the atmospheric-pressure passage 130 and the regulated-pressure chamber R10; and shutting off of the communication, whereby the working fluid having the servo pressure that is equal to a pressure in accordance with the master pressure is supplied from the regulator 24 to the master cylinder device 16. That is, even in a situation in which the working fluid at the adjusted pressure cannot be supplied to the second pilot chamber R9, the present system can effectuate the above-indicated state in which the braking force is generated depending on the high-pressure-source pressure, namely, the state in which the brake devices 12 generate the braking force whose magnitude depends on the pressure of the working fluid supplied from the high-pressure-source device 22 to the master cylinder device 16, when the high-pressure-source device 22 is properly operating or when a certain extent of the pressure remains in the accumulator 94 even if the high-pressure-source device 22 is not properly operating.

In the present system, the master pressure is arranged to be introduced into the first pilot chamber R8 of the regulator 24. In place of the arrangement, the pressure of the working fluid in the reaction-force chamber R6 or in the inter-piston chamber R3 may be arranged to be introduced. Such an arrangement can also effectuate the above-indicated state in which the braking force is generated depending on the high-pressure-source pressure, namely, the state in which the brake devices 12 generate, in dependence on the pressure of the working fluid supplied from the high-pressure-source device 22, the braking force having a magnitude in accordance with the operation force applied to the brake pedal 14 by the driver, in a situation in which the working fluid at the adjusted pressure cannot be supplied to the second pilot chamber R9.

6. Pressure-Increase Linear Valve and Pressure-Decrease Linear Valve

The pressure-increase linear valve 26 and the pressure-decrease linear valve 28 are ordinary electromagnetic linear valves, and illustration of the structure thereof is dispensed with. The pressure-increase linear valve 26 is a normally closed electromagnetic linear valve and is disposed between the high-pressure-source device 22 and the second pilot chamber R9 of the regulator 24. The pressure-increase linear valve 26 has a plunger whose distal end functions as a valve member and a valve seat on which the plunger is seated. In the pressure-increase linear valve 26, there are formed: an adjusted-pressure chamber which is located on one of opposite sides of the valve seat nearer to the plunger and which communicates with the second pilot chamber R9 of the regulator 24 for accommodating the working fluid having an adjusted pressure $P_{AJT}$ corresponding to a second pilot pressure $P_{PLT}$ of the second pilot chamber R9; and a high-pressure chamber which is located on the other of the opposite sides of the valve seat remote from the plunger and which communicates with the high-pressure-source device 22 for receiving the working fluid having a high-pressure-source pressure $F_{ACC}$. There acts, on the plunger, a pressure-difference-based acting force $F\Delta_{PA}$ based on a pressure difference between the high-pressure-source pressure $P_{ACC}$ and the adjusted pressure $P_{PLT}$, in a direction in which the plunger is separated away from the valve seat. At the same time, the plunger is biased in a direction in which the plunger is seated on the valve seat by a biasing force $F_{KA}$ of a spring that is larger than the pressure-difference-based acting force $F\Delta_{PA}$. By energization of a coil, there also acts, on the plunger, an electromagnetic acting force $F_{EA}$ having a magnitude in accordance with an energizing current $i_A$ supplied to the coil in the same direction as the pressure-difference-based acting force $F\Delta_{PA}$, namely, in a direction opposite to the biasing force $F_{KA}$ of the spring. Roughly, in the pressure-increase linear valve 26, the energizing current $i_A$ is determined such that a given adjusted pressure $P_{AJT}$ is obtained while considering a balance among the pressure-difference-based acting force $F\Delta_{PA}$, the electromagnetic acting force $F_{EA}$, and the biasing force $F_{KA}$, and the determined energizing current is given to the coil. It is noted that, in the pressure-increase linear valve 26, the adjusted pressure $P_{AJT}$ increases with an increase in the energizing current $i_A$. In other words, an opening degree (e.g., a degree of easiness with which the valve changes from the closed state to the open state) becomes higher and a valve-opening pressure becomes higher, with an increase in the energizing current $i_A$.

The pressure-decrease linear valve 28 is a normally open electromagnetic linear valve disposed between the second pilot chamber R9 of the regulator 24 and the reservoir 20 as the low-pressure source. The pressure-decrease linear valve 28 has a plunger whose distal end functions as a valve member and a valve seat on which the plunger is seated. In the pressure-decrease linear valve 28, there are formed: an atmospheric-pressure chamber which is located on one of opposite sides of the valve seat nearer to the plunger and which communicates with the reservoir 20 so as to have an atmospheric pressure $P_{RSV}$; and an adjusted-pressure chamber which is located on the other of the opposite sides of the valve seat remote from the plunger and which communicates with the second pilot chamber R9 of the regulator 24 for accommodating the working fluid having the adjusted pressure $P_{AJT}$ corresponding to the second pilot pressure $P_{PLT}$. There acts, on the plunger, a pressure-difference-based acting force $F\Delta_{PR}$ based on a pressure difference between the adjusted pressure $P_{AJT}$ and the atmospheric pressure $P_{RSV}$ in a direction in which the plunger is separated away from the valve seat. At the same time, the plunger is biased by a biasing force $F_{KR}$ of a spring in the same direction as the pressure-difference-based acting force $F\Delta_{PR}$. By energization of a coil, there also acts, on the plunger, an electromagnetic acting force $F_{ER}$ having a magnitude in accordance with an energizing current $i_R$ supplied to the coil, in a direction opposite to the pressure-difference-based acting force $F\Delta_{PR}$ and the biasing force $F_{KR}$ of the spring. Roughly, in the pressure-decrease linear valve 28, the energizing current $i_R$ is determined such that a given adjusted pressure $P_{PLT}$ is obtained while considering a balance among the pressure-difference-based acting force $F\Delta_{PR}$, the electromagnetic acting force $F_{ER}$, and the biasing force $F_{KR}$, and the determined energizing current is given to the coil. It is noted that, in the pressure-decrease linear valve 28, the adjusted pressure $P_{AJT}$ increases with an increase in the energizing current $i_R$. In other words, an opening degree (e.g., a degree of easiness with which the valve changes from the closed state to the open state) becomes lower and a valve-opening pressure becomes higher, with an increase in the energizing current $i_R$.

From the viewpoint of the functions of the pressure-increase linear valve 26 and the pressure-decrease linear valve 28 described above, in the present system, the pressure-increase linear valve 26 and the pressure-decrease linear valve 28 provide a pressure adjusting valve device configured to adjust the pressure of the working fluid to the adjusted pressure $P_{PLT}$. The pressure adjusting valve device is configured to adjust the second pilot pressure $P_{PLT}$ of the regulator 24 as the adjusted pressure $P_{AJT}$. In the hydraulic brake system, the pressure regulator device configured to regulate the pressure of the working fluid supplied from the high-pressure-source device 22 as the high-pressure source is constituted by: a pressure adjusting valve device including the pressure-increase linear valve 26 and the pressure-decrease linear valve 28; and the regulator 24 explained above. Further, a fluid-pressure supply source configured to supply the working fluid to each of the brake devices 12 provided for the respective wheels 10 is constituted by the high-pressure-source device 22, the pressure regulator device, the master cylinder device 16, and the brake pedal 14.

7. Antilock Unit

The working fluid supplied from the master cylinder device 16 is supplied to the brake devices 12 of the respective wheels 10 via the ABS unit 18. The ABS unit 18 includes four pairs of a shutoff valve 140 and a pressure-decrease valve 142 provided for the respective four wheels 10. The shutoff valve 140 and the pressure-decrease valve 142 in each pair are disposed in series. A fluid passage 144 extending from the output port P4 of the master cylinder device 16 branches into two passages. One of the branched two passages passes through the shutoff valve 140 and the pressure-decrease valve 142 corresponding to one of the two front wheels 10 while the other of the branched two passages passes through the shutoff valve 140 and the pressure-decrease valve 142 corresponding to the other of the two front wheels 10, and the branched two passages join with each other so as to serve as a fluid passage that reaches one of two reservoirs 146. Similarly, a fluid passage 148 extending from the output port P3 and passing through the first pilot chamber R8 of the regulator 24 branches into two passages. One of the branched two passages passes through the shutoff valve 140 and the pressure-decrease valve 142 corresponding to one of the two rear wheels 10 while the other of the branched two passages passes through the shutoff valve 140 and the pressure-decrease valve 142 of the other of the two rear wheels 10, and the branched two passages join with each other so as to serve as a fluid passage that reaches the other of the two reservoirs 146. The working fluid supplied from the master cylinder device 16 is supplied from a portion between the shutoff valve 140 and the pressure-decrease valve 142 of each of the four pairs to the brake device 12 of the corresponding wheel 10 via a corresponding one of four supply passages 150.

The shutoff valve 140 is a normally open electromagnetic open/close valve, namely, an open/close valve configured to be opened in a non-energized state and to be closed in an energized state. The shutoff valve 140 has a function of shutting off supply of the working fluid from the master cylinder device 16 to the brake device 12 when closed. The pressure-decrease valve 142 is a normally closed electromagnetic open/close valve, namely, an open/close valve configured to be closed in a non-energized state and to be opened in an energized state. The pressure-decrease valve 142 has a function of allowing supply of the working fluid from the brake device 12 to the reservoir 146 when opened, thereby decreasing the pressure of the working fluid of the wheel cylinder of the corresponding brake device 12.

The ABS unit 18 includes a pair of return passages 152 each provided upstream of the corresponding two shutoff valves 140, namely, at a portion between the corresponding two shutoff valves 140 and the master cylinder device 16. The return passage 152 is for returning the working fluid stored in the corresponding reservoir 146. Return pumps 154 are disposed in the respective return passages 152. The two return pumps 154 are configured to be operated simultaneously by a single motor 156.

8. Control System

Control of the present system, namely, brake control, is executed by the brake ECU 30. Roughly, the brake ECU 30 controls the high-pressure-source device 22, specifically, the brake ECU 30 controls the motor 92 of the high-pressure-source device 22, and further controls the pressure-increase linear valve 26 and the pressure-decrease linear valve 28. The brake ECU 30 further controls the ABS unit 18, specifically, the brake ECU 30 controls the shutoff valves 140, the pressure-decrease valves 142, and the motor 156 that activates the return pumps 154. The brake ECU 30 is constituted by a computer as a main element and drive circuits (drivers) for driving the motor 92 of the high-pressure-source device 22, the pressure-increase linear valve 26, the pressure-decrease linear valve 28, the shutoff valves 140, the pressure-decrease valves 142, the motor 156 for activating the return pumps 154, and so on.

To the brake ECU 30, the following sensors are connected: the reaction-force pressure sensor 86 for detecting a pressure $P_{RCT}$ in the reaction-force chamber R6 or in the opposing chamber R5 (hereinafter referred to as "reaction-force pressure $P_{RCT}$" where appropriate); the high-pressure-source pressure sensor 96 for detecting the high-pressure-source pressure $P_{ACC}$ (the so-called accumulator pressure") that is a pressure of the working fluid supplied from the high-pressure-source device 22 to the regulator 24; and the servo-pressure sensor 134 for detecting the servo pressure $P_{SRV}$ that is a pressure of the working fluid fed from the regulator 24 to the master cylinder device 16. The pressures $P_{RCT}$, $P_{ACC}$, $P_{SRV}$ are obtained as information necessary for the control. Further, the present system is provided with a brake operation amount sensor 160 for detecting a brake operation amount $\delta_{DL}$ and a brake operation force sensor 162 for detecting a brake operation force $F_{PDL}$. The brake operation amount $\delta_{PDL}$ and the brake operation force $F_{PDL}$ are obtained as operation information of the brake pedal 14 as the brake operation member. (In FIG. 1, the brake operation amount sensor 160 and the brake operation force sensor 162 are marked with a sign "$\delta_{PDL}$" indicative of the brake operation amount and a sign "$F_{PDL}$" indicative of the brake operation force, respectively.) The sensors 160, 162 are also connected to the brake ECU 30. The control in the present system is executed based on the values detected by the sensors.

For controlling the high-pressure-source device 22, the brake ECU 30 activates the pump 90, namely, the motor 92, such that the high-pressure-source pressure $P_{ACC}$ detected by the high-pressure-source pressure sensor 96 is held within a set pressure range defined by a set upper-limit pressure $P_{ACCU}$ and a set lower-limit pressure $P_{ACCL}$. In the normal condition, the brake ECU 30 calculates a required braking force that is a braking force to be required based on the brake operation amount $\delta_{PDL}$ detected by the brake operation amount sensor 160 and the brake operation force $F_{PDL}$ detected by the brake operation force sensor 162. The brake ECU 30 determines, as a required hydraulic braking force, a difference obtained by subtracting a regenerative braking force to be generated by the regenerative brake system from the calculated required braking force. The brake ECU 30 determines a target servo pressure based on the required hydraulic braking force and controls the pressure-increase linear valve 26 and the pressure-decrease linear valve 28, namely, controls the energizing currents $i_A$, $i_R$ supplied thereto, such that the servo pressure $P_{SRV}$ detected by the servo-pressure sensor 134 becomes equal to the target servo pressure.

The brake ECU 30 also executes control in an instance where any of the wheels 10 locks in a state in which the hydraulic braking force is being generated, namely, the brake ECU 30 executes control relating to ABS operation (control relating to ABS function). Each of the wheels 10 is provided with a wheel speed sensor (not shown). When it is determined that any of the wheels 10 locks in the braking operation, the shutoff valve 140 corresponding to the locked wheel 10 is closed and the working fluid is inhibited from being supplied from the master cylinder device 16 to the brake device 12. At the same time, the pressure-decrease valve 142 corresponding to the locked wheel 10 is opened, and the working fluid is discharged from the corresponding brake device 12 to the reservoir 146. When it is determined that the locked state is canceled, the pressure-decrease valve 142 in question is closed and the shutoff valve 140 in question is opened, whereby the working fluid is allowed to be supplied from the master cylinder device 16 to the brake device 12 in question, and the hydraulic braking force is restored. This series of operation is repeated in a short time period, so that the ABS operation is executed. During the ABS operation, the return pumps 154 are continuously activated by the brake ECU 30, and the working fluid discharged to the reservoirs 146 is returned to the upstream side of the shutoff valves 140.

<Fluid Leakage from Pressure-Decrease Valve of Antilock Unit and Detection of Fluid Leakage>

In the hydraulic brake system constructed as described above, when any of the four pressure-decrease valves 142 of the ABS unit 18 is suffering from fluid leakage, a part of the working fluid supplied from the master cylinder device 16 leaks into the corresponding reservoir 146. In this instance, there may be a risk that a sufficient braking force is not obtained for the brake device 12 corresponding to the pressure-decrease valve 142 in question.

When the ABS operation is initiated in a state in which the pressure-decrease valve 142 is suffering from the fluid leakage and a certain degree of the working fluid is stored in the reservoir 146, the working fluid is not properly discharged from the brake device 12 to the reservoir 146, and the pressure is not sufficiently decreased in the brake device 12. This may lead to a delay in the ABS function.

In ordinary hydraulic brake systems, the pressurizing chamber is pressurized in dependence on the brake operation force. Consequently, when the pressurizing piston moves forward, in a state in which the pressure-decrease valve 142 is suffering from fluid leakage, by an amount corresponding to the fluid leakage, there occurs an event in which the brake pedal is depressed further than usual. Because the driver can feel the event, it is possible for the driver to detect the fluid leakage from the pressure-decrease valve 142 owing to an unnatural feeling with respect to the braking operation. In the present hydraulic brake system, in contrast, the structure of the master cylinder device 16 described above does not cause the input piston 46 to move forward even when the first pressurizing piston 42 and the second pressurizing piston 44 move forward. Consequently, the above-indicated event does not occur, and the driver cannot detect the fluid leakage from the pressure-decrease valve 142 by the unnatural feeling with respect to the braking operation.

Many hydraulic brake systems are provided with a pressure sensor, i.e., a master-pressure sensor, for detecting a pressure of the working fluid supplied from the master cylinder device 16, namely, the so-called master pressure $P_{MST}$. In the present hydraulic brake system, the control is executed based on the servo pressure $P_{SRV}$, and the master-pressure sensor is not provided in the present hydraulic brake system. It is thus impossible to detect the fluid leakage from the pressure-decrease valve 142 based on a variation in the master pressure $P_{MST}$.

In view of the above, the present hydraulic brake system is configured such that the fluid leakage from the pressure-decrease valve 142 is detected at the time of startup of the vehicle utilizing the return pumps 154 provided in the ABS unit 18. Referring to the time chart of FIG. 2, the method for detecting fluid leakage according to one embodiment will be explained.

The vehicle on which the present hydraulic brake system is installed is the so-called smart entry vehicle configured such that the hydraulic brake system starts to operate when a door is opened and such that an ignition switch (IG) does not turn on unless the brake pedal 14 is depressed. As shown in FIG. 2, in a state in which the brake pedal 14 is depressed, the regenerative braking force is not generated but the servo pressure $P_{SRV}$ in accordance with the braking operation is generated, and the hydraulic braking force in accordance with the magnitude of the servo pressure $P_{SRV}$ is generated in each brake device 12.

After a lapse of a short period of time, the brake ECU 30 drives the motor 156 so as to activate the return pumps 154 for a predetermined time. In a case where no pressure-decrease valves 142 are suffering from the fluid leakage, almost no working fluid is stored in both of the two reservoirs 146. Consequently, almost no working fluid returns to the master cylinder device 16 via the return passages 152 even when the return pumps 154 are activated, and the servo pressure $P_{SRV}$ does not substantially change.

In contrast, in a case where any of the pressure-decrease valves 142 are suffering from the fluid leakage, the working fluid is stored in any of the reservoirs 146 and the stored working fluid returns to the master cylinder device 16 by activation of the return pumps 154. Specifically, in a case where the pressure-decrease valve 142 corresponding to brake device 12 on the front-wheel side is suffering from the fluid leakage, the working fluid is returned to the second pressurizing chamber R2 via the corresponding return passage 152 and the fluid passage 144. In a case where the pressure-decrease valve 142 corresponding to the brake device 12 on the rear-wheel side is suffering from the fluid leakage, the working fluid is returned to the first pressurizing chamber R1 via the corresponding return passage 152 and the fluid passage 148. The working fluid returned to the first pressurizing chamber R1 and/or the second pressurizing chamber R2 causes an increase in the volume of the first pressurizing chamber R1 and/or the second pressurizing chamber R2 and an increase in the pressure of the working fluid stored therein, so that the pressure of the working fluid in the input chamber R4 is increased. That is, the servo pressure $P_{SRV}$ is increased in a usual case. As apparent from the structure of the regulator 24, however, the regulated-pressure chamber R10 of the regulator 24 is open to the reservoir 20 as the low-pressure source when the servo pressure $P_{SRV}$ is increased. Consequently, the servo pressure $P_{SRV}$ immediately returns to the original level. That is, the servo pressure $P_{SRV}$ varies in a pulsatory manner, as shown in FIG. 2. In most cases, this pulsing variation in the servo pressure $P_{SRV}$ arises from a pulsing operation of the return pump 154, and it can be considered that the pulsing variation of the servo pressure $P_{SRV}$ is caused as a result of transmission of the pulsing operation of the return pump 154.

The brake ECU 30 monitors a variation in the servo pressure $P_{SRV}$ by means of the servo-pressure sensor 134 as a pressure detector. When the pulsing variation described above is detected, the brake ECU 30 determines that any of the pressure-decrease valves 142 are suffering from the fluid leakage. When the brake ECU 30 determines that any of the pressure-decrease valves 142 are suffering from the fluid leakage, the brake ECU 30 notifies the driver of the fact by means of an indicator provided in a cabin of the vehicle.

According to the method for detecting fluid leakage described above, it is possible to easily detect at the time of startup of the vehicle, without using the master-pressure sensor, the fluid leakage from any of the pressure-decrease valves 142 of the ABS unit 18 that cannot be detected by the unnatural feeling with respect to the braking operation <Modification>

In the fluid leakage detecting method according to the illustrated embodiment, the fluid leakage form any of the pressure-decrease valves 142 is detected by the servo-pressure sensor 134. In the hydraulic brake system having the master-pressure sensor, the fluid leakage from any of the pressure-decrease valves 142 may be detected based on a variation in the master pressure $P_{MST}$ detected by the master-pressure sensor. The fluid leakage detecting method according to the illustrated embodiment enables detection of the fluid leakage from any of the pressure-decrease valve 142 each of which is the electromagnetic open/close valve. The fluid leakage can be detected in an instance where each pressure-decrease valve is an electromagnetic linear valve. The fluid leakage detecting method according to the illustrated embodiment is applied to the hydraulic brake system constructed as described above, namely, the brake system configured to generate the braking force that does not depend on the brake operation force. The method may be applicable to other systems such as a system configured to generate the braking force by boosting the brake operation force. Further, in the fluid leakage detecting method according to the illustrated embodiment, the fluid leakage from any of the pressure-decrease valves 142 is detected at the time of startup of the vehicle. The timing of detecting the fluid leakage is not limited to the timing of startup of the vehicle, but may be any timing such as timing when the vehicle is at a stop.

What is claimed is:

1. A method for detecting fluid leakage from a pressure-decrease valve in a hydraulic brake system having an ABS device including: a shutoff valve for shutting off supply of a working fluid from a fluid-pressure supply source to a brake device provided for a wheel; the pressure-decrease valve for discharging the working fluid from the brake device; a reservoir for storing the working fluid discharged from the pressure-decrease valve; and a return pump for returning the working fluid stored in the reservoir to a portion between the shutoff valve and the fluid-pressure supply source, the method comprising the steps of:

activating the return pump in a state in which the hydraulic brake system is not in ABS operation, and detecting the fluid leakage from the pressure-decrease valve in the ABS device based on a variation in a pressure of the working fluid in the fluid-pressure supply source caused when the return pump is activated.

2. The method for detecting fluid leakage according to claim 1, wherein the fluid-pressure supply source includes: (a) a pressure regulator device configured to regulate the working fluid supplied from a high-pressure source and to supply the working fluid whose pressure is regulated; (b) a brake operation member on which a braking operation by a driver is performed; and (c) a master cylinder device to which the working fluid supplied from the pressure regulator device is introduced and which is configured to supply, in a normal state, the working fluid whose pressure depends not on an operation force applied to the brake operation member but on a pressure of the introduced working fluid, to the brake device via the ABS device.

3. The method for detecting fluid leakage according to claim 2, wherein the fluid-pressure supply source includes a pressure detector configured to detect a pressure of the working fluid supplied from the pressure regulator device, and the hydraulic brake system is configured to control, in the normal state, the pressure of the working fluid supplied from the pressure regulator device such that the pressure detected by the pressure detector becomes equal to a target pressure, for controlling a braking force to be generated by the brake device, and wherein the fluid leakage from the pressure-decrease valve is detected based on a variation in the pressure detected by the pressure detector in the step of detecting fluid leakage.

4. The method for detecting fluid leakage according to claim 3, wherein the pressure regulator device includes a mechanical pressure regulator configured to regulate a pressure of the working fluid supplied from the high-pressure source to supply the working fluid having a pressure in accordance with a pilot pressure, the pressure regulator device being configured to control the pressure of the working fluid to be supplied from the pressure regulator device by adjusting the pilot pressure, and wherein the fluid leakage from the pressure-decrease valve is detected, in the step of detecting fluid leakage, based on a pulsing variation of the pressure detected by the pressure detector, the pulsing variation depending on a motion of the return pump.

5. The method for detecting fluid leakage according to claim 1, which is carried out at the time of startup of a vehicle on which the hydraulic brake system is installed.

* * * * *